(12) United States Patent
Sirany et al.

(10) Patent No.: US 6,213,260 B1
(45) Date of Patent: Apr. 10, 2001

(54) BRAKE PAD AND METHODS OF BRAKING AND RESURFACING A ROTATABLE BRAKE MEMBER

(75) Inventors: Dallas R. Sirany; Peter D. Sirany, both of Minnetonka, MN (US)

(73) Assignee: Brake Tru, Inc., Minnetonka, MN (US)

( * ) Notice: Subject to any disclaimer, the term of this patent is extended or adjusted under 35 U.S.C. 154(b) by 0 days.

(21) Appl. No.: 09/412,209

(22) Filed: Oct. 5, 1999

(51) Int. Cl.⁷ .............................. F16D 69/00; B24B 1/00; B24B 5/00; B24B 27/00; B24B 7/17
(52) U.S. Cl. ................................ 188/250 B; 188/251 A; 188/251 M; 188/251 R; 451/57; 451/63; 451/324; 451/359; 451/415; 451/434
(58) Field of Search .......................... 188/251 R, 251 A, 188/251 M, 250 B, 257, 71.1; 451/63, 57, 324, 348, 359, 415, 434

(56) References Cited

U.S. PATENT DOCUMENTS

| | | |
|---|---|---|
| 2,772,095 | 11/1956 | Barnes . |
| 3,521,411 | 7/1970 | Hennig et al. . |
| 3,613,318 | 10/1971 | Gianatasio . |
| 3,823,627 | 7/1974 | Scharfen . |
| 3,848,708 | 11/1974 | Noguchi . |
| 3,990,543 * | 11/1976 | Grewette ........................... 188/71.1 |
| 4,086,732 | 5/1978 | Ramsey . |
| 4,156,479 | 5/1979 | Kawamura . |
| 4,202,140 | 5/1980 | Alessio . |
| 4,240,530 | 12/1980 | Tillenburg . |
| 4,269,002 | 5/1981 | Venere et al. . |
| 4,336,730 | 6/1982 | Kopecko et al. . |
| 4,361,988 | 12/1982 | Gramlich . |
| 4,485,898 | 12/1984 | Bracken et al. . |
| 4,493,231 | 1/1985 | Wössner . |
| 4,596,317 | 6/1986 | Nagai et al. . |
| 4,682,446 | 7/1987 | Woodall et al. . |
| 4,854,199 | 8/1989 | Norman . |
| 5,056,266 | 10/1991 | Norris . |
| 5,099,728 | 3/1992 | Thiem . |
| 5,155,944 | 10/1992 | Nagel et al. . |
| 5,242,746 * | 9/1993 | Brommier ........................... 428/252 |
| 5,538,108 * | 7/1996 | Russo ............................... 188/250 E |
| 5,775,468 * | 7/1998 | Lam ................................ 188/251 A |
| 5,816,901 | 10/1998 | Sirany . |
| 5,942,015 | 8/1999 | Culler et al. . |
| 6,068,094 * | 5/2000 | Takahashi ....................... 188/251 M |
| 6,139,413 * | 10/2000 | Sirany .............................. 451/415 |

* cited by examiner

Primary Examiner—J. J. Swann
Assistant Examiner—David Divine
(74) Attorney, Agent, or Firm—Merchant & Gould P.C.

(57) ABSTRACT

A brake pad operates to both resurface the braking surface of a rotor, and then automatically continue functioning as a normal brake pad. The rotor resurfacing is accomplished on the vehicle, employing all the components of a vehicle brake assembly, creating a perfect fit of the rotor and brake pad surfaces. In one embodiment, the brake pad includes a backing plate, a first plane of frictional material on the backing plate, and a second plane of frictional material mounted over the first plane of frictional material. The second plane of frictional material includes abrasive strips, each of the strips being separated from an adjacent one of the strips by a region of the first plane of frictional material. Preferably, the second plane of frictional material removes material from a rotor, when the brake pad is in frictional engagement with the rotor. Preferred methods include removing material from the rotor to resurface the rotor by engagement of the second plane of frictional material against the rotor, and slowing rotation of the rotor to brake the motor vehicle, with the first plane of frictional material after the second plane of frictional material is degraded.

18 Claims, 2 Drawing Sheets

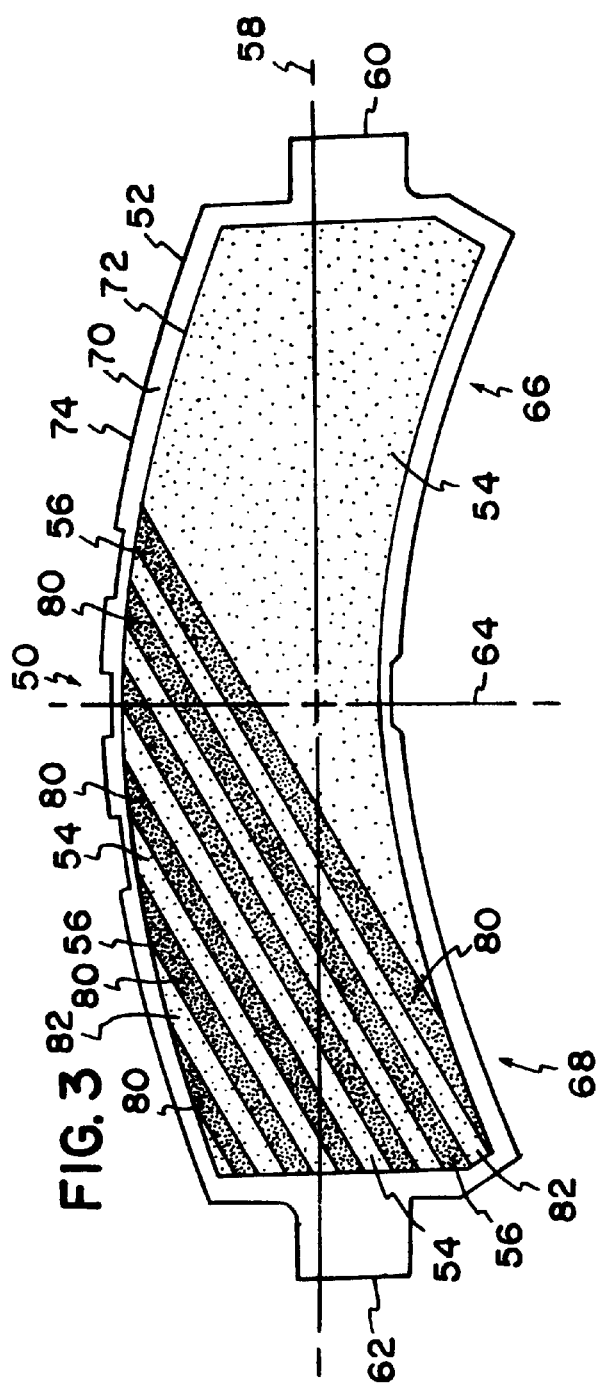
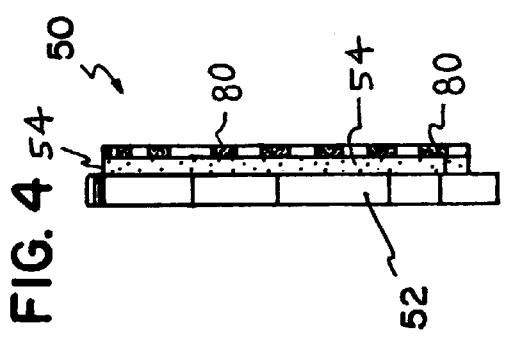

BRAKE PAD AND METHODS OF BRAKING AND RESURFACING A ROTATABLE BRAKE MEMBER

FIELD OF THE INVENTION

This disclosure concerns a brake pad. In particular, this disclosure describes a brake pad having at least two planes of frictional material; and methods for resurfacing a rotatable brake member; and methods for braking.

BACKGROUND

Brake rotors and drums provide braking surfaces against which brake pads and brake shoes, respectively, frictionally engage to brake a vehicle. Ideally, brake rotors should rotate perpendicularly to the established axis without tolerance. Brake drums should rotate concentrically to the established axis without tolerance. In addition, the braking surfaces of brake rotors should be parallel to the caliper brake pad locating surfaces and the face of the hydraulic plunger.

During braking, it is also important that the brake pads and brake shoes "track" perfectly on the braking surfaces of the brake rotors and brake drums, respectively, without lateral movement. Lateral movement or "skating" of the brake pads and brake shoes with respect to the braking surfaces creates undesirable vibration and noise.

In an attempt to address this problem, products and servicing procedures have been developed to stabilize the brake pad and the brake shoe with respect to the caliper bracket and the back plate, respectively. One such servicing procedure involves applying a liquid adhesive to the back of the brake pad. The adhesive then solidifies between the brake pad backing plate and the caliper bracket to minimize lateral movement of the brake pads.

In another attempt to solve the skating problem, an adhesive backed aluminum sheet is secured between backing plates of the braking pads and the caliper brackets. The aluminum sheets provide a soft surface in which depressions outlining the shape of the caliper brackets form. The depressions minimize movement and stabilize the brake pads. Both attempts to solve the skating problem lose their effectiveness over time as the adhesives and the depressions break down or wear away. Moreover, both attempted solutions require additional servicing procedures and products which are time consuming and costly.

Excessive wear during use of the vehicle causes the braking surface of brake rotors and drums to wear unevenly, and generates heat, causing warping in the braking surface. As a result, brake rotors and drums do not rotate perpendicularly and concentrically, respectively, to the established axis. These errors, or tolerances, are known as run out, flatness, parallelism and perpendicularly. They are the source of many objectionable problems.

In such cases, the braking surface must be resurfaced or, if beyond specified tolerances, replaced. Previously, resurfacing of the brake rotor has been accomplished with a lathe-type resurfacing tool. With a lathe-type resurfacing tool, cutter blades are moved laterally across the rotating braking surface to cut off a thin layer of the braking surface and expose a generally smooth, renewed braking surface. The renewed braking surface typically has a surface finish of about 40–80 microfinish and includes microscopic, nonconcentric grooves. As the cutter blades move laterally across the rotating braking surface, the microscopic grooves are created in the braking surface. These grooves form a lead angle created by the laterally moving cutter blade. As a whole, the series of grooves interconnected by the lead angle spiral towards the center of the brake rotor or the inner edge of the brake drum.

Lathe resurfacing tools are expensive and require careful adjustment. Even a slight misadjustment of the cutter head can cause damage to the braking surface of the rotor or drum. Furthermore, the extreme pressure created by engaging the very small surface of the cutter head against the braking surface requires very heavy duty ways and bracing. In addition, this device may require multiple passes across the braking surface with the cutter blade to remove a layer of sufficient thickness so as to achieve a smooth braking surface. As a result, a standard cutting thickness is normally chosen to reduce the number of passes across the braking surface. Although time is saved by decreasing the number of passes required to achieve a smooth braking surface, the standard cutting depth is often excessive, reducing the life span of the rotor or drum., To solve some of these problems, a grinder resurfacing tool has been used to resurface the braking surface of a vehicle brake rotor. These devices employ grinding stones or chocks which are formed from multiple layers of abrasive particles bonded together. As the stones contact the braking surface, layers of the abrasive particles as well as the removed braking surface material flake away to expose new layers of abrasive particles. However, braking surface material does plug the grinding stone surface, and it becomes necessary to dress the surface of the grinding stone to remove clogged abrasives, exposing new grinding particles. As a result, the grinding stones are capable of resurfacing multiple braking surfaces.

Furthermore, because it is believed that a smooth, polished braking surface is desirable to prevent excessive wear of the brake pad or brake shoe and to prolong useful life of each brake pad and the brake shoe, the grinding stones are designed to create a smooth, polished braking surface. Because the abrasive particles or grits on each layer are randomly positioned with respect to abrasive particles on adjacent layers, any peaks created in the braking surface by one layer of abrasive particles will be cut away by the next exposed adjacent layer of abrasive particles to establish a generally smooth, polished braking surface. However, because new abrasive material or new layers of abrasive particles are continually exposed, the grinding stones also create an ever changing uncontrollable polished surface condition on the braking surface. Consequently, any grooves created in the surface are deminimus and are not generally concentric. The grinding stones are typically mounted in an independent rotational device so as to polish off the worn surface as both the brake rotor and the grinding stones rotate relative to each other about dissimilar axes of rotation.

Previously, the braking surface of brake rotors and brake drums has been resurfaced on independent resurfacing devices using either cutting blades or grinding stones. With independent resurfacing devices, the brake rotor or drum must be dismounted from the vehicle to resurface the braking surface of the brake rotor. Such procedures involve disassembling the rotor or the drum; securing the rotor or drum to an independent resurfacing device such as a turning machine; machining or resurfacing the braking surface; and reassembling the rotor or drum to the vehicle. This procedure is time-consuming, costly and requires great skill and expertise. As a result, many vehicle owners put off necessary brake resurfacing because of the cost and inconvenience of having their vehicle tied up during brake resurfacing.

Moreover, these methods do not entirely achieve a preferred end result. Because the rotor or drum must be disassembled from its original assembly to be placed upon an independent machine, the rotor or drum will not be returned to its identical position upon reassembly. Upon reassembly of the rotors and drums, any accumulated errors or misalignment causes vibration and other objectionable results.

To reduce some of the time required for brake resurfacing and to improve resurfacing results, brake resurfacing devices have been adapted to resurface brake rotors without removing the rotors from the vehicle. Typically, the device is mounted to the wheel hub, wheel shaft, or any other convenient member of the vehicle. The cutting blade or the grinding stone of the mounted resurfacer is typically supported by the mounted resurfacing device itself. The resurfacing device positions and aligns either the cutting blades or the grinding stones against the braking surface of the rotor or drum to resurface the braking surface. As a result, brake resurfacing accuracy is dependent upon proper mounting of the resurfacing device. To properly mount the resurfacing device requires careful adjustment. Such adjustment is time consuming and costly.

With both independent and mounted resurfacing devices, the cutter blades or the grinding stones are carried or supported by the device itself In addition, the device itself positions the cutting blades or the grinding stones against the rotor or drum surface to be resurfaced. Because the device itself supports and positions either the cutting blades or the grinder stones against the braking surface, this device requires exacting alignment and adjustment to insure that the braking surface is resurfaced correctly to minimize or eliminate error or tolerance. This alignment is often time consuming, costly and prone to mechanic error.

Moreover, despite careful adjustment, both devices still result in imperfect brake resurfacing. Because both the independent and mounted resurfacing devices position the cutting blades or the grinder stones against the rotor or drum braking surface, the particular idiosyncrasies of the devices are machined into the braking surface of the rotor or drum. These idiosyncrasies, otherwise known as composite errors, include accumulated manufacturing tolerances and wear upon the resurfacing devices over time. These composite errors, which are machined into the braking surface, prevent rotor surfaces from being parallel to the caliper brake pad locating surfaces and the face of the hydraulic plunger and also prevent brake drums from rotating concentrically to the established axis without tolerance.

Cost is another major disadvantage to these methods for resurfacing braking surfaces. Both methods require expensive independent or mounted resurfacing devices.

SUMMARY OF THE DISCLOSURE

In one aspect, the disclosure describes a method of braking a motor vehicle including a step of pressing a brake pad against a rotating rotor, wherein the brake pad has a first plane of frictional material and a second plane of frictional material over the first plane. During the step of pressing the brake pad against the rotor, preferably, material is removed from the rotor to resurface the rotor by engagement of the second plane of frictional material against the rotor. Preferably, while pressing the brake pad against the rotor, the rotation of the rotor is slowed to brake the motor vehicle.

Preferably, the step of removing the material from the rotor includes removing material from the rotor until the second plane of frictional material is degraded.

Preferably, after removing the material from the rotor until the second plane of frictional material is degraded, rotation of the rotor is slowed by frictionally engaging the first plane of frictional material against the rotor.

In another aspect, the disclosure is directed to a brake pad for frictional engagement with a rotatable brake member. Preferred brake pads described herein comprise a backing plate, a first plane of frictional material on the backing plate, and a second plane of frictional material mounted over the first plane of frictional material. Preferably, the second plane of frictional material comprises a plurality of abrasive strips, wherein each of the strips is separated from an adjacent one of the strips by a region of the first plane of frictional material. The second plane of frictional material is preferably constructed and arranged to remove material from the rotatable member, when the brake pad is in frictional engagement with the rotatable member.

In another aspect, the disclosure describes a braking system for a motor vehicle comprising a rotable member secured to a wheel of the motor vehicle, a caliper oriented to support a brake pad and to selectively move the brake pad against and away from the rotatable member, and a brake pad. The brake pad preferably includes a backing plate, a first plane of frictional material on the backing plate, and a second plane of frictional material mounted over the first plane of frictional material and between the first plane and the rotatable member. Preferably, the second plane of frictional material comprises a plurality of abrasive strips, with each of the strips being separated from an adjacent one of the strips by a region of the first plane of frictional material. Preferably, the second plane of frictional material is oriented to frictionally engage the rotatable member before the first plane engages the rotatable member, when the brake pad is compressed by the caliper against the rotatable member. Preferably, the second plane of frictional material is constructed and arranged to remove material from the rotatable member, when the brake pad is in frictional engagement with the rotatable member.

BRIEF DESCRIPTION OF THE DRAWINGS

FIG. 3 is an enlarged, top plan view of one of the brake pads used in the braking system depicted in FIG. 1, constructed according to principles of this disclosure; and FIG. 4 is a side elevational view of the brake pad depicted in FIG. 3.

DETAILED DESCRIPTION

A. Overview of Brake Pad Construction and Methods

In general, this disclosure describes an improvement over my own U.S. Pat. No. 5,816,901, which patent is herein incorporated by reference.

In U.S. Pat. No. 5,816,901, I invented a method and tool for resurfacing the brake rotors of a vehicle. My invention included an adhesive-backed abrasive pad attached to a backing plate. To resurface the rotor, the caliper was disassembled, the brake pads were removed, and my resurfacing tool (comprising the braking plate with the abrasive pad) was installed in place of the brake pads. The rotor was then rotated, while pressure was applied to the brakes. The frictional contact between the abrasive pad and the rotor operated to resurface the rotor. After resurfacing, the abrasive tools were removed, and the brake pads were replaced. The caliper was then reassembled.

It has been found that, while the method and apparatus described in my U.S. Pat. No. 5,816,901 is an improvement over many of the old methods and constructions of the prior art, there can be improvements. This disclosure concerns many such improvements. For example, in my U.S. Pat. No. 5,816,901, the step of removing the tool after resurfacing and replacing it with a brake pad disturbs the relationships of the brake pads to the rotor established during resurfacing. We have discovered, as described herein, an improved brake pad that can both resurface the brake rotor, and then automatically continue to function as a normal brake pad. One advantage is that the rotor resurfacing is accomplished on the vehicle, employing all the components of a vehicle brake assembly, creating a perfect fit of the rotor and brake pad surfaces. The controlled resurfacing is accomplished entirely during normal driving.

Our improvement as described herein assures that during the resurfacing process, a controlled amount of rotor surface is removed. Resurfacing is ended by the brake pad surface engaging the rotor surface, thereby totally eliminating the possibility of removing more rotor material than is intended. The methods and constructions described herein simplify resurfacing processes of rotors. When using brake pad constructions as described herein, after installation of the improved brake pads, the vehicle is ready to drive off with no need for further mechanical work. The resurfacing is accomplished within the first few hundred feet of normal driving, without impacting safety of proper braking. Further, when following preferred techniques described herein, the operator or user will not need any expertise other than a simple installation of the brake pad constructions as described herein.

B. Example Braking System

Figure 1:
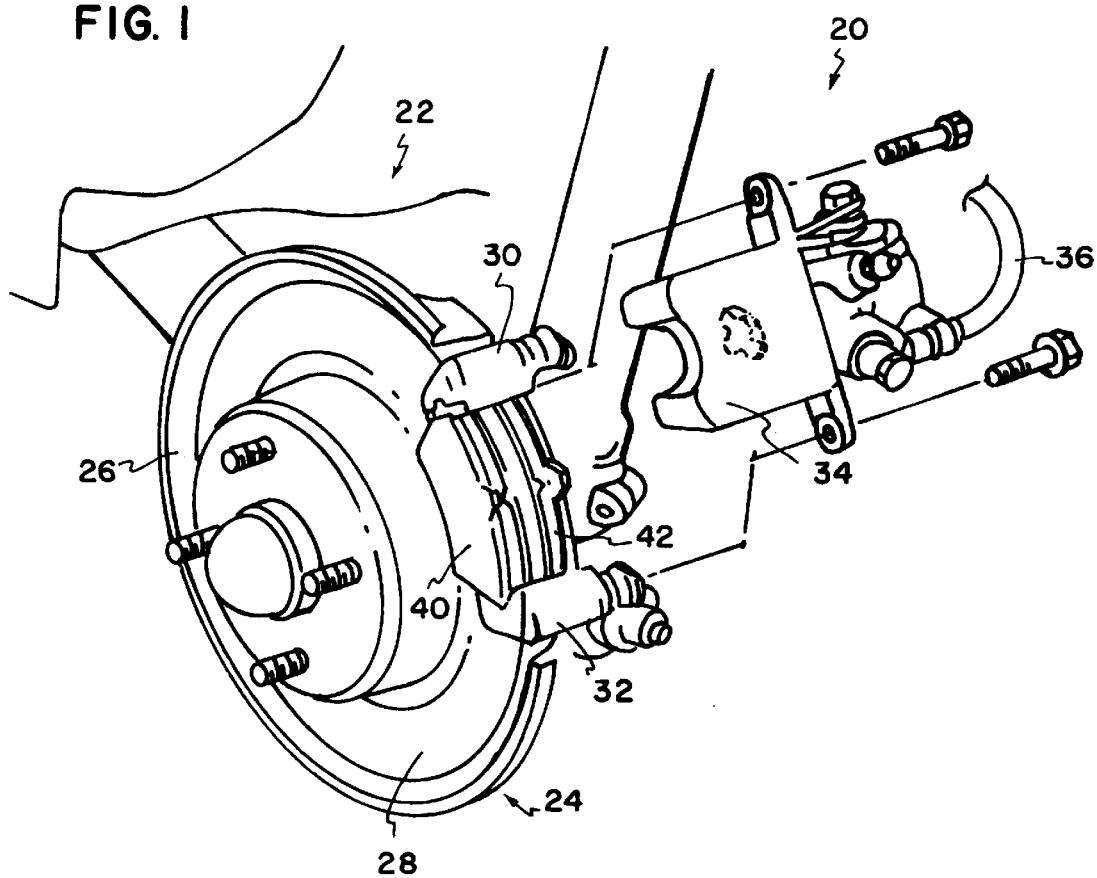
FIG. 1 is an exploded perspective view of a braking system, utilizing principles of the present disclosure.
Figure 2:
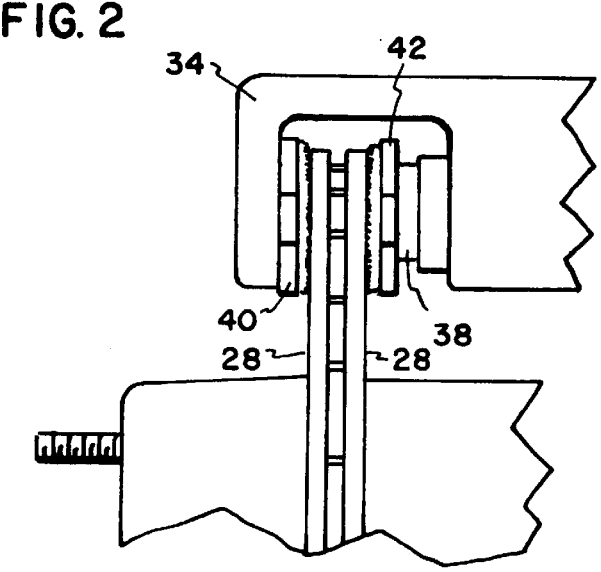
FIG. 2 is an enlarged, fragmented, side elevational view of the braking system depicted in FIG. 1.

Attention is directed to FIG. 1. In FIG. 1, one example of a braking system utilizing brake pad constructions of the present disclosure is shown at 20. Brake system 20 can be either a disk brake assembly or a drum brake assembly. In the particular embodiment illustrated in FIG. 1, the brake system 20 is a disk brake assembly 22. Disk brake assembly 22 includes a rotatable brake member 24, which is conventionally attached to a wheel. The rotatable brake member 24 may be either a rotor or a drum. In the particular embodiment illustrated in FIG. 1, the rotatable brake member 24 includes a rotor 26. The rotor 26 has a braking surface 28. Caliper brackets 30, 32 are configured for mounting and supporting brake pads 40, 42. A caliper housing 34 defines locating surfaces upon which the brake pads 40, 42 are supported. A brake line 36 provides power, typically in the form of hydraulic power, to a piston or hydraulic plunger 38 (FIG. 2).

In operation, the disk brake assembly 22 brakes a motor vehicle by slowing rotation of the rotor 26. Specifically, pressure is applied through the brake line 36, which energizes the hydraulic plunger 38. The hydraulic plunger 38 moves the brake pads 40, 42 against the braking surface 28 of the rotor 26. This frictional engagement of the brake pads 40, 42 against the rotor 28 causes the rotor to slow down its rotation, which causes the wheel to slow its rotation.

Each of the brake pads 40, 42 includes at least first and second regions of frictional material, as described further below. As braking occurs, one of the regions of frictional material will frictionally engage the braking surface 28 of the rotor 26 to remove material from the braking surface 28.

The rotor 32 is rotated about an axis established by the motor vehicle's own spindle bearing. In addition, the abrasive surfaces of the brake pads 40, 42 are held stationary with respect to the rotor 26. As a result, idiosyncrasies such as those present with independent and mounted resurfacing devices are not machined into the braking surfaces 28 of the rotor 26. One of regions of frictional material is degraded and worn away after resurfacing, such that the other region of frictional material remains to operate in a normal, braking capacity.

C. Preferred Brake Pad Constructions

Attention is now directed to FIGS. 3 and 4. In FIGS. 3 and 4, one preferred brake pad construction is illustrated at 50. The brake pad construction 50 may typically be used in the brake system 20, described above. In other words, the brake pads 40, 42 are preferably constructed as described below for brake pad construction 50.

The brake pad construction 50 preferably includes the backing plate 52, a first plane of frictional material 54, and a second plane of frictional material 56. The backing plate 52 functions to hold and support the first plane of frictional material 54 and the second plane of frictional material 56. The backing plate 52 is configured for securing to the hydraulic plunger 38 (FIG. 2) of the brake system 20, such that the first and second planes 54, 56 of frictional material can be moved into and out of engagement with the braking surface 28 of the rotor 26. The backing plate 52 defines a longitudinal axis 58 extending a length of the backing plate 52 between a first end 60 and a second, opposite end 62. The backing plate 52 also defines a central line is symmetry 64 that divides the backing plate 52 into a first half 66 and a second half 68. By "line of symmetry", it is meant that in general, the perimeter of the first half 66 is a mirror image of the perimeter of the second half 68.

Still in reference to FIG. 3, the first plane of frictional material 54 is oriented to cover most of the backing plate 52. In particular, the first plane of frictional material 54 is oriented to cover at least 75%, typically at least 90% of the backing plate 52. In the particular embodiment illustrated in FIG. 3, the only portion of the backing plate 52 that is not covered by the first plane of frictional material 54 is the outermost region 70 between the edge 72 of the first plane of frictional material 54 and the peripheral edge 74 of the backing plate 52. As can be seen in FIG. 3, the region 70 generally circumscribes the first plane of frictional material 54.

The first plane of frictional material is a material suitable for operating during normal, braking operations. As such, the first plane of frictional material 54 has a coefficient of friction that is sufficient to cause frictional engagement and slowing of a rotor 26, but without removing material from the braking surface 28 of the rotor 26. Typically, the first plane of frictional material 54 will have a Rockwell "C" hardness of typically about 25. The first plane of frictional material 54 may be made from material of a conventional nature. One suitable material could be TP1353M manufactured by Thiokol. The first plane of frictional material 54 will be a material that will permit normal, braking operation of at least 10,000 miles, typically 30,000 miles, before requiring a change of a brake pad construction.

Still in reference to FIG. 3, the second plane of frictional material 56 is now discussed. In preferred arrangements, the second plane of frictional material 56 will be mounted over the first plane of frictional material 54. This means that after degradation of the second plane of frictional material 56, the first plane of frictional material 54 will be exposed. The second plane of frictional material 56 is oriented between the first plane 54 and the braking surface 28 of the rotor 26, such that the second plane of frictional material 56 will engage the rotor 26 before the first plane 54 engages the rotor.

Preferably, the second plane of frictional material 65 will have a higher coefficient of friction than the first plane of frictional material 54. The second plane of frictional material 56 will be constructed and arranged to remove material from the braking surface 28, when the brake pad construction 50 is in frictional engagement with the rotor 26. Preferably, the second plane of frictional material 56 will be constructed from abrasive particles includes ceramics, silicates, silicon carbides, aluminum oxides, carbides, diamond, synthetic diamond, cubic boron nitride, or a mixture thereof bonded together. The second plane of frictional material 56 will have a grade sufficient to produce a surface condition on the braking surface 28 of about 100–1,000 microinches, when measured laterally across the surface of the rotor 26. In preferred systems, the second plane of frictional material 56 will have a grade sufficient to produce a finish on the rotor 26 of about 350–650 microinches, when measured laterally across the rotor 26, and 30–150 microinches when measured radially within a particular groove of the rotor 26. Suitable grades include between 16–1,000, preferably 40–120 grade, as defined by ANSI standards. Preferably, the second plane of frictional material 56 will have a Rockwell "C" hardness of about 75–90.

In preferred operations, the second plane of frictional material will be of a nature and quality to degrade after 10–300 feet of engagement (or, after 3–100 revolutions, typically, at least 15 revolutions of a rotor having a diameter of 12 in.), when the second plane of frictional material 56 is engaging a material having a surface finish of about 100–1000 micro-inches, when measured across the rotor 26, and about 30–50 microinches when measured radially within a particular groove of the rotor 26. By "degrade", it is meant that the second plane of frictional material 56 will be eroded (or breakdown) to a point where less than 5%, typically, less than 1% of the original abrasive particles of the second plane of frictional material 56 remains.

Preferably, the second plane of frictional material 56 includes at least one, and more preferably, a plurality (that is, more than one) of abrasive strips 80. Preferably, there will be no more than 10 strips, typically about 1–6 strips, in some cases, about 2–6 strips 80. Each of the abrasive strips 80 is preferably separated from an adjacent strip by a region 82 of the first plane of frictional material 54. In the particular embodiment illustrated in FIG. 3, there are 6 abrasive strips 80. While a variety of embodiments are contemplated herein, in the embodiment illustrated in FIG. 3, each of the abrasive strips 80 has about an equal width, ranging from 1/16–1/4 inch. In certain, typical arrangements, each of the abrasive strips 80 will have a width of about 1/8 inch.

In preferred embodiments, each of the regions 82 of the first plane of frictional material 54 will have about an equal width. Preferably, each of the regions 82 will have a width of 1/16–1/4 inch, typically about 1/8 inch. Although in the FIG. 3 embodiment, the width of the abrasive strips 80 is equal to the width of the regions 82, in other embodiments, they can be of unequal and varying widths.

In preferred embodiments, the abrasive strips 80 will be arranged on the trailing end of the brake pad construction 50. By "trailing end" it is meant the end 62 that is the final portion of contact between the brake pad construction 50 and the rotor 26, when the rotor 26 is rotating in a forward direction. In other words, for any one given point on the braking surface 28, as the rotor rotates, it will contact first, the brake pad construction 50 adjacent to the first end 60, move across the brake pad construction 50, until reaching the trailing end or second end 62. By locating the abrasive strips 80 on the trailing end 62 of the brake pad construction 50, as the second plane of frictional material 56 degrades and removes material from the braking surface 28, the removed material will quickly exit the surfaces of the brake pad construction 50 and the rotor 26.

In preferred arrangements, a majority of the second plane of frictional material 56 will be in the second half 68 of the brake pad construction 50. Preferably, at least 50% of the second plane of frictional material 56 will be in the second half 68. In some constructions, 100% of the second plane of frictional material 56 will be in the second half 68. Typically, there will be about 60–90% of the second plane of frictional material 56 in the second half 68. Typically, the second plane of frictional material 56 will cover no more than 50%, at least about 5%, and usually about 10–40% of the first plane of frictional material 54.

Preferably, the abrasive strips 80 will be arranged relative to the longitudinal axis 58 to help expedite the removal of residue of the removed braking surface material and of the degraded second plane of frictional material 56. In preferred arrangements, the abrasive strips 80 will be angled relative to the longitudinal axis 58. Preferably, the angle between each of the abrasive strips 80 and the longitudinal axis 58 will be at least 15°, no greater than about 75°, and typically about 30°–60°. Because the abrasive strips 80 are angled relative to the longitudinal axis 58 in preferred embodiments, the regions 82 lacking the second plane of frictional material 56 will create channels to help direct and remove the residue from the resurfacing operation. The angle of the regions 82 relative to the longitudinal axis 58 will typically be the same angle as the angle of the abrasive strips 80 relative to the longitudinal axis 58. Typically, this will be at least 15°, no greater than about 75°, and preferably about 30°–60°.

D. Preferred Methods of Operation

In operation, the brake pad construction 50 can be used to both resurface the braking surface 28 of the rotor 26 and operate as a normal, brake pad, as described below.

Typically, it is suggested that after 30,000 miles of operation, the braking surface 28 of the rotor 26 be resurfaced. To accomplish this, the brake pad constructions 50 described herein may be used. To resurface the braking surface 28 of the rotor 26, the tire of the vehicle is removed. Next, the caliper housing 34 is disassembled. This allows access to the presently existing brake pads. The presently existing brake pads are removed and replaced with brake pad constructions 50. The caliper housing 34 is again reassembled. The tire is remounted to the wheel. Next, the motor vehicle is driven, and the brake pad constructions 50 are pressed against the rotating rotor 26. While the brake pad constructions 50 are pressed against the rotor 26, the second plane of frictional material 56 frictionally engages the braking surface 28. The engagement is sufficient to remove material from the braking surface 28. This step of removing material from the rotor 26 is continued, until the second plane of frictional material 56 is degraded. Typically, this will be after about 10–300 feet of engagement at driving speeds above 20 mph; or about 300–1000 feet at speeds below 20 mph.

The step of removing material from the rotor 26 by contact with the second plane of frictional material 56 not only resurfaces the braking surface 28, but also functions to slow rotation of the rotor 26, to act in a normal, braking capacity. After the second plane of frictional material 56 is degraded, the first plane of frictional material 54 is able to make frictional contact with the rotor 26, when the brake pad construction 50 is pressed against the braking surface 28 of the rotor 26. This first plane of frictional material 54 is constructed of a material sufficient to permit the brake pad construction 50 to act as a normal brake pad. That is, the brake pad construction 50, after the second plane of frictional material 56 is degraded, functions to slow the rotation of the rotor 26 by frictional engagement between the first plane of frictional material 54 and the braking surface 28, without the first plane of frictional material 54 resurfacing the braking surface 28. The brake pad construction 50 with the first plane of frictional material 54 in frictional engagement with the braking surface 28 will serve to brake the motor vehicle for at least another 10,000 miles, typically another 30,000 miles.

Eventually, the braking surface 28 of the rotor 26 will again need resurfacing. Typically, this will be when the frictional material 54 has worn to about 1/16 inch from the backing plate 52. Usually, this is after another 10,000–30,000 miles. The brake pad construction 50 will be removed, and a second, new brake pad construction 50 will replace it. The second, new brake pad construction 50 will operate to resurface the braking surface 28 of the rotor 26, and then act as a normal, typical brake pad. It can be appreciated that with each new set of brake pad constructions 50, there is independent resurfacing advantages, to reestablish the brake pad to rotor 26 frictional characteristics.

While this disclosure has been described with reference to example embodiments, those skilled in the art will recognize that there are many embodiments utilizing the principles described herein.

What is claimed is:

1. A method of braking a motor vehicle; the motor vehicle having a rotor secured to a wheel; the method comprising:
   (a) pressing a brake pad against a rotating rotor;
      (i) the brake pad having a first plane of frictional material and a second plane of frictional material over the first plane;
   (b) while pressing the brake pad against the rotor, removing material from the rotor to resurface the rotor by engagement of the second plane of frictional material against the rotor;
      (i) said step of removing material from the rotor includes removing material from the rotor until the second plane of frictional material is degraded;
   (c) while pressing the brake pad against the rotor, slowing rotation of the rotor to brake the motor vehicle;
      (i) after removing material from the rotor until the second plane of frictional material is degraded, said step of slowing rotation of the rotor to brake the motor vehicle includes frictionally engaging the first plane of frictional material against the rotor.

2. A method according to claim 1 wherein:
   (a) before the second plane of frictional material is degraded, said step of slowing rotation of the rotor to brake the motor vehicle includes frictionally engaging the second plane of frictional material against the rotor.

3. A method according to claim 1 wherein:
   (a) said step of removing material from the rotor includes removing material from the rotor to resurface the rotor to a finish of 350–650 microinches.

4. A method according to claim 1 wherein:
   (a) said step of pressing a brake pad against a rotating rotor includes pressing a brake pad where the second plane of frictional material is a plurality of abrasive strips, each of the strips separated by a region of the first plane of frictional material.

5. A method according to claim 1 wherein:
   (a) said step of removing material from the rotor until the second plane of frictional material is degraded includes pressing the brake pad against the rotating rotor for at least 15 revolutions of the rotor.

6. A method according to claim 1 further including:
   (a) after said step of slowing rotation of the rotor to brake the motor vehicle by frictionally engaging the first plane of frictional material against the rotor, operating the motor vehicle for at least 10,000 miles using the brake pad.

7. A method according to claim 6 wherein:
   (a) after operating the motor vehicle for at least 10,000 miles, removing the brake pad and replacing it with a second brake pad;
      (i) the second brake pad having a first plane of frictional material and a second plane of frictional material over the first plane;
   (b) resurfacing the rotor by pressing the second brake pad against the rotating rotor until the second plane of frictional material of the second brake pad is degraded; and
   (c) after the second plane of frictional material of the second brake pad is degraded, slowing rotation of the rotor by frictionally engaging the first plane of frictional material of the second brake pad against the rotor.

8. A brake pad for frictional engagement with a rotatable brake member; the brake pad comprising:
   (a) a backing plate;
   (b) a first plane of frictional material on the backing plate, the first plane of frictional material having a first hardness;
   (c) a second plane of frictional material mounted over the first plane of frictional material;
      (i) the second plane of frictional material comprising a plurality of abrasive strips; each of said strips being separated from an adjacent one of said strips by a region of said first plane of frictional material;
      (ii) the second plane of frictional material having a greater hardness than the first hardness; and
      (iii) the second plane of frictional material being constructed and arranged to initially remove material from the rotatable member before degrading, when the brake pad is in frictional engagement with the rotatable member.

9. A brake pad according to claim 8 wherein:
   (a) said second plane of frictional material has a hardness of 75–90 Rockwell C.

10. A brake pad according to claim 8 wherein:
    (a) said second plane of frictional material has a grade of about 16–1000.

11. A brake pad according to claim 10 wherein:
    (a) said first plane of frictional material covers at least 90% of the backing plate; and
    (b) said second plane of frictional material covers no more than 50% of the first plane of frictional material.

12. A brake pad according to claim 10 wherein:
    (a) said backing plate has a geometric line of symmetry dividing the backing plate into a first half and a second half;

(i) at least 90% of said second plane of frictional material being oriented on said second half of said backing plate.

13. A brake pad according to claim 12 wherein:

(a) said plurality of abrasive strips including not more than 6 strips; each of said strips having a width of between 1/16th and 1/4th inch; each of said strips being separated from the adjacent one of said strips by a width of between 1/16th and 1/4th inch of said first plane of frictional material.

14. A brake pad according to claim 13 wherein:

(a) each of said abrasive strips has a width of about 1/8th inch.

15. A brake pad according to claim 12 wherein:

(a) said backing plate defines a longitudinal axis; each of said plurality of strips being oriented at an angle of between 30–60 degrees from said longitudinal axis.

16. A braking system for a motor vehicle comprising:

(a) a rotatable member secured to a wheel of the motor vehicle;

(b) a caliper oriented to support a brake pad and to selectively move the brake pad against and away from said rotatable member;

(c) said brake pad including:
   (i) a backing plate;
   (ii) a first plane of frictional material on the backing plate, the first plane of frictional material having a first hardness;

(c) a second plane of frictional material mounted over said first plane of frictional material and between said first plane and said rotatable member;

(A) the second plane of frictional material comprising a plurality of abrasive strips; each of said strips being separated from an adjacent one of said strips by a region of said first plane of frictional material;

(B) the second plane of frictional material having a hardness greater than the first hardness;

(C) the second plane of frictional material being oriented to frictionally engaging said rotatable member before said first plane engages said rotatable member, when said brake pad is compressed by said caliper against said rotatable member; and (D) said second plane of frictional material being constructed and arranged to initially remove material from the rotatable member before degrading, when the brake pad is in frictional engagement with the rotatable member.

17. A braking system according to claim 16 wherein:

(a) said first plane of frictional material covers at least 90% of the backing plate; and (b) said second plane of frictional material covers no more than 50% of the first plane of frictional material.

18. A brake pad according to claim 17 wherein:

(a) said backing plate has a line of symmetry dividing the backing plate into a first half and a second half;
   (i) at least 90% of said second plane of frictional material being oriented on said second half of said backing plate.

* * * * *